UNITED STATES PATENT OFFICE.

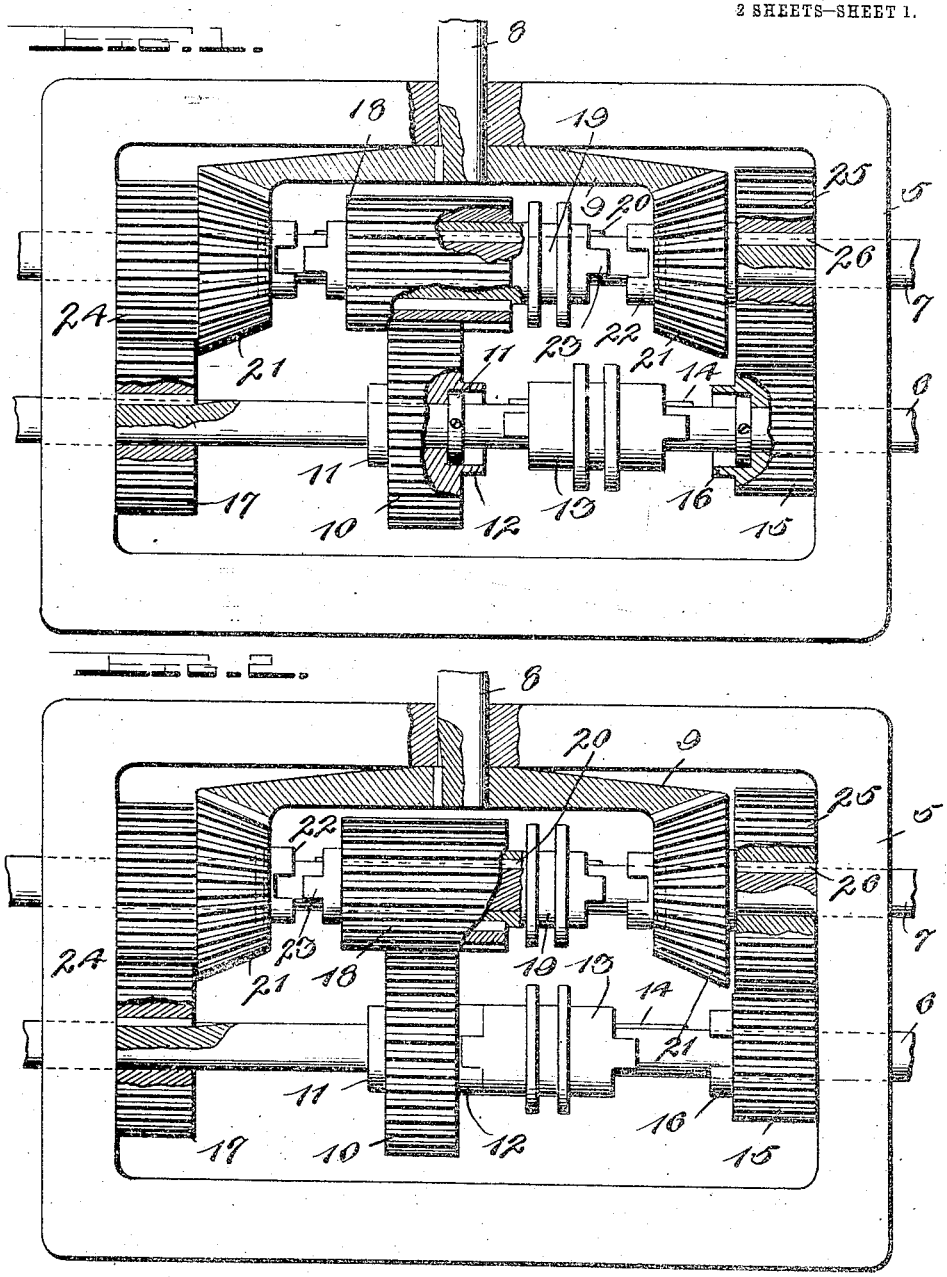

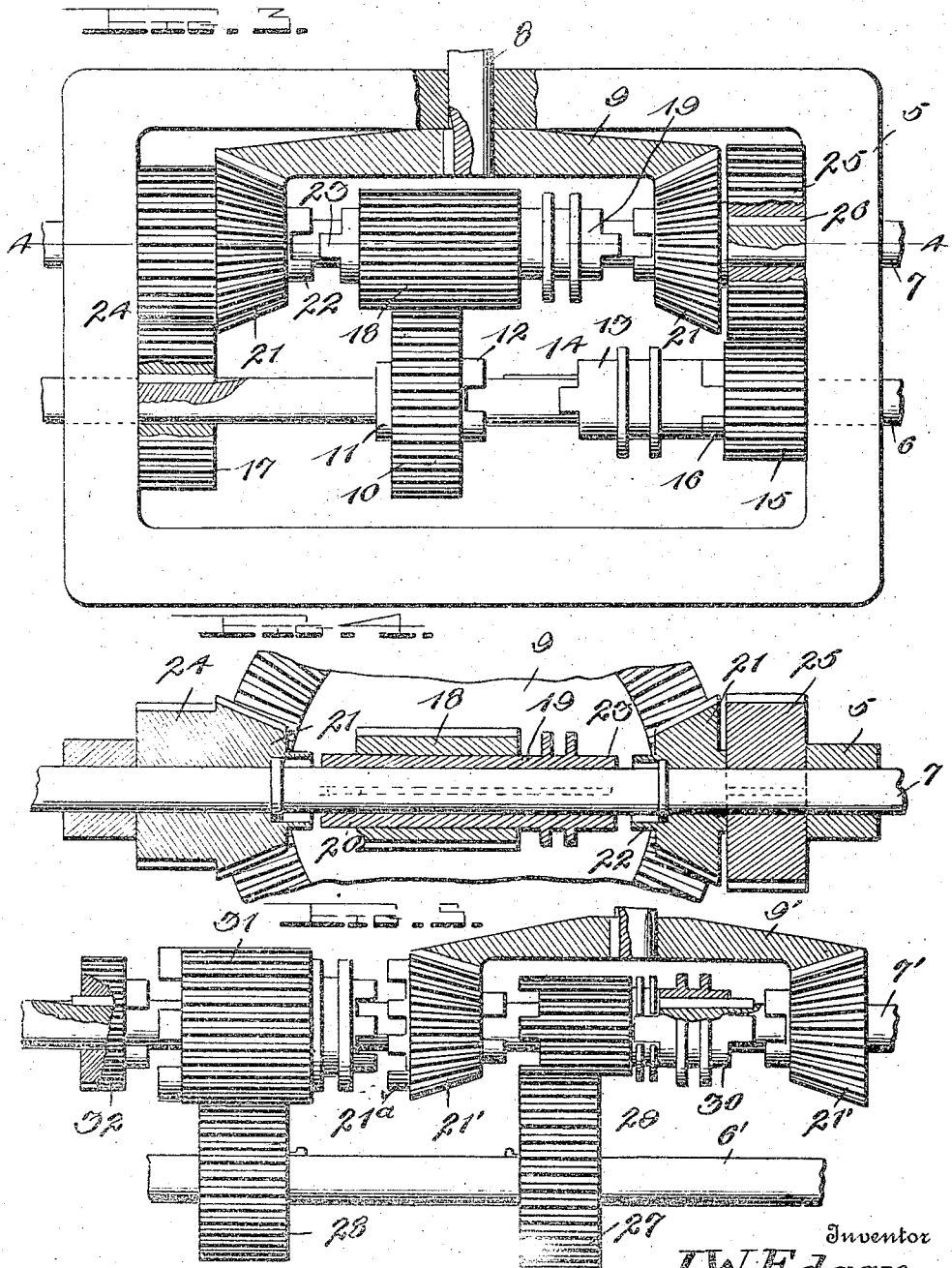

JAMES W. EDGAR, OF McLAUGHLIN, SOUTH DAKOTA.

SPEED-CHANGING DEVICE.

1,064,199.

Specification of Letters Patent. Patented June 10, 1913.

Application filed March 9, 1912. Serial No. 682,637.

*To all whom it may concern:*

Be it known that I, JAMES W. EDGAR, a citizen of the United States, residing at McLaughlin, in the county of Corson and State of South Dakota, have invented certain new and useful Improvements in Speed-Changing Devices, of which the following is a specification, reference being had to the accompanying drawings.

This invention relates to improvements in speed changing devices and has for its object to provide a very simple arrangement of transmission gears whereby rotation may be transmitted from the driving shaft to the driven shaft at several different speeds.

A further and more specific object of the invention is to provide a device of this character wherein the power transmitting gears at all times remain in mesh, whereby a high degree of efficiency and durability of the device is assured.

A still further object of the invention is to provide a speed transmission device of the above character which may be inexpensively manufactured, is reliable and efficient in practical operation and provides means whereby the speed of rotation of the driving shaft may be easily and quickly changed.

With the above and other objects in view, the invention consists of the novel features of construction, combination and arrangement of parts hereinafter fully described and claimed, and illustrated in the accompanying drawings, in which—

Figure 1 is a top plan view of a speed changing device embodying the present invention, with clutches in neutral positions; Fig. 2 is a similar view showing the transmission gears in position to operate the driving shaft at a low speed; Fig. 3 is a similar view showing the position of the gears for high speed transmission; Fig. 4 is a section taken on the line 4—4 of Fig. 3; and Fig. 5 is a plan view illustrating a slightly modified form of the device.

Referring in detail to the drawings and more particularly to Figs. 1 to 4 thereof 5 designates a frame or case in which a driving shaft 7 is rotatably mounted and connected to the shaft of the engine in any preferred manner. A transmission shaft 6 is also mounted in the case or frame 5 and disposed in parallel relation to the shaft 7. The driven shaft 8 is journaled at one end in one of the side walls of said case or frame and carries a beveled gear 9 which is keyed or otherwise secured upon said shaft.

Upon the transmission shaft 6 a gear 10 is loosely mounted between collars 11 fixed upon said shaft, said gear being provided upon one face with the clutch lugs 12. A clutch member 13 is also arranged upon said driving shaft and is keyed thereon as at 14 for longitudinal sliding movement. A cog or pinion 15 is loosely mounted upon the transmission shaft 6 between a collar on said shaft and one end of the frame 5 and is provided with the clutch lugs 16 on its inner face, said sliding clutch member 13 being disposed for movement between the opposed clutch faces of the gears 10 and 15 respectively. A gear 17 is rigidly keyed upon the transmission shaft adjacent to the opposite end of the frame 5.

A driving gear 18 is keyed upon a sliding clutch member 19, which in turn is keyed upon the drive shaft 7 as shown at 20. Beveled gears 21 are loosely mounted upon the shaft 7 and coöperate with the beveled teeth of the gear 9 at diametrically opposite points. The inner faces of these beveled gears are provided with clutch lugs 22 with which similar lugs 23 on the ends of the clutch member 19 coöperate. A cog gear 24 is integrally formed with one of the beveled gears 21 and meshes with the gear 17 which is keyed upon the transmission shaft. A gear 25 is keyed upon the shaft 7 as at 26, said latter gear being independent of the other of the pinions or gears 21. This cog gear 25 meshes with the teeth of the gear or pinion 15 upon the transmission shaft.

It will be noted that the movable gear 18 is of sufficient length to at all times remain in mesh with the teeth of the gear 10 on the driving shaft in its movement between the clutch faces of the beveled gears 21. To the clutch members 13 and 19 suitable operating levers are connected. From the above arrangement of elements, the operation of the device will be understood as follows.

When it is desired to transmit rotation at low speed to the shaft 8, the clutch member 19 remains at neutral position as shown in Fig. 1 upon driving shaft 7. The clutch member 13 on the shaft 6 is shifted to the left to engage the same with gear 10 thereby locking said pinion or gear on the transmission shaft and transmitting power through the same and shaft 6 together with gears 17, 2 and 21 to the beveled gear 9 on the shaft 8. This arrangement of the parts is illustrated in Fig. 2 of the drawings. When it is desired to transmit power to the driven shaft 8 at high speed, the clutch member 19 remains in neutral position upon shaft 7 and the operator shifts the clutch member 13 on the transmission shaft 6 to the right to engage the same with the gear 15, thus transmitting power through the gear 25 on the driving shaft 7 through gears 15, 17, 24 and 21 to the shaft 8. When it is desired to transmit rotation at intermediate speed to shaft 8 the clutch member 13 on shaft 6 is placed in neutral position with relation to gears 10 and 15. The clutch member 19 on shaft 7 is shifted to the left to engage the same with the bevel pinion 21, carrying gear 24, thereby locking said pinion with the drive shaft 7 and transmitting power through the same and the beveled gear 9 to shaft 8. Thus reverse rotation may be imparted to the shaft 8 by shifting the clutch member 19 to the right to engage bevel pinion 21 and gear 9 to shaft 8.

In Fig. 5 I have shown a slightly modified form of the invention wherein all of the sliding clutch members are arranged upon the shaft 7'. On shaft 6' the spaced gears 27 and 28 are keyed, said gears being of different diameters. The beveled pinions or gears 21' on the shaft 7' engage with the beveled gear 9' as in the preferred form of the device and between these pinions two sliding clutch members 29 and 30 are arranged upon said shaft. These clutch members are adapted to co-act with each other and with the gears 21'. One of the gears 21' is provided upon its outer face with clutch teeth as indicated at 21ᵃ with which the teeth of a short sliding clutch member 31 are adapted to engage. The other end of this clutch member is also provided with clutch teeth to co-act with the teeth of a clutch element 32 which is rigidly keyed upon the shaft 7'. In this modified construction, high speed may be transmitted from the shaft 7 to the shaft 8 by shifting the clutch members 31 to engage the clutch element 32 keyed upon the shaft 7', and shifting the clutch member 29 out of engagement with the clutch 30 and into engagement with the left hand gear 21' thus freeing it from shaft 7. To obtain a low speed of the shaft 8, the clutch 31 is shifted into engagement with the gear 21' and the member 29 is shifted to engage the clutch element 30. An intermediate or medium speed is obtained by moving the member 29 to engage gear 21' and shifting the clutch member 30 into engagement with the member 29, the clutch member 31 being in a neutral position and loose upon shaft 7'.

From the foregoing it is believed that the construction and manner of operation of the invention in both of its forms will be clearly understood. It will be noted that in both instances the transmission gears on the shaft 7' remain in permanent co-active engagement with the gears upon the transmission shaft so that all liability of disengagement of said gears so that they cannot be again connected is prevented. In the ordinary gear transmission mechanism wherein the driving and transmission gears are shifted out of contact with each other, wear upon the gear teeth finally prevents their proper meshing engagement so that new gears must be provided.

The various parts of the device are of simple form and may therefore be manufactured at small cost. While I have shown and described the preferred construction and arrangement of the elements, it will be understood that they are susceptible of considerable modification without departing from the essential feature or sacrificing any of the advantages thereof.

Having thus described the invention what is claimed is:—

1. In a speed changing mechanism, parallel driving and transmission shafts, a driven shaft, a beveled gear fixed to the driven shaft, beveled gears loose upon the driving shaft engaging with the beveled gear at diametrically opposite points, additional gears upon the driving shaft, and gears on the transmission shaft permanently engaged with the last named gears on the driving shaft, one of said latter gears being longitudinally movable and carrying clutch members to lock the beveled gears upon the drive shaft whereby rotation may be transmitted to the driven shaft in opposite directions.

2. In a speed changing mechanism, parallel driving and transmission shafts, a driven shaft, a beveled gear fixed thereto, gears loosely mounted on the drive shaft meshing with the beveled gear at diametrically opposite points, a gear slidably mounted on said drive shaft between the first named gears, said gears having co-acting clutches whereby said sliding gear may be moved into locking engagement with either of the first named gears, gears on the transmission shaft, gears arranged on said driving shaft permanently engaged with the latter gears, an additional gear on the transmission shaft permanently engaged with the sliding gear on said drive shaft and a clutch member on the transmission shaft to lock said latter gear thereon and transmit rotary movement to said transmission shaft.

3. A speed changing mechanism comprising parallel driving and transmission shafts, a driven shaft and a beveled gear fixed thereon, gears loosely mounted upon the drive shaft to mesh with said beveled gear, a gear slidably mounted on the drive shaft between the first named gears, clutch devices to connect the sliding gear to either of the loosely mounted gears, additional gears on said drive shaft of different diameters, gears on the transmission shaft to mesh with said latter gears, one of the gears on the transmission shaft being loosely mounted, another gear loosely mounted on the transmission shaft meshing with the sliding gear on the drive shaft, the gears on the transmission and driving shafts being permanently engaged, and a sliding clutch member on the transmission shaft to lock either of the loosely mounted gears thereon whereby power may be transmitted to the driven shaft at various speeds.

4. In a speed changing mechanism, driving and transmission shafts, a driven shaft, a gear on the latter shaft, a gear loose on the driving shaft meshing with the gear on the driven shaft, a sliding gear on the driving shaft, said loosely mounted gear and the sliding gear having clutch faces whereby the loose gear may be locked on the shaft, spaced pairs of fixed and loose intermeshing gears on the driving and transmission shafts, an additional gear loosely mounted upon the transmission shaft to permanently engage with said sliding gear, and a clutch member on the latter shaft coöperating with the loose gears thereon to lock the same upon the said shaft to transmit power to the driven shaft.

5. In a speed changing mechanism, a driven shaft, driving and transmission shafts, a gear on the driven shaft, a gear loosely mounted on the driving shaft to mesh with the gear on the driven shaft, a sliding gear on the driving shaft, said gears having co-acting clutches whereby the loose gear may be locked on the shaft, a gear fixed upon the driving shaft, spaced gears having different diameters loosely mounted upon the transmission shaft and meshing with the sliding and fixed gears upon the driving shaft, additional intermeshing loose and fixed gears on the driving and transmission shafts respectively, said latter gears differing in diameter from said first named gears, and a sliding clutch member arranged upon the transmission shaft to lock either of the loose gears thereon whereby power may be transmitted to the driven shaft at various speeds.

In testimony whereof I hereunto affix my signature in the presence of two witnesses.

JAMES W. EDGAR.

Witnesses:
  W. DEAN HURLBUT,
  BEN MAJHOR.